United States Patent Office 3,266,540
Patented August 16, 1966

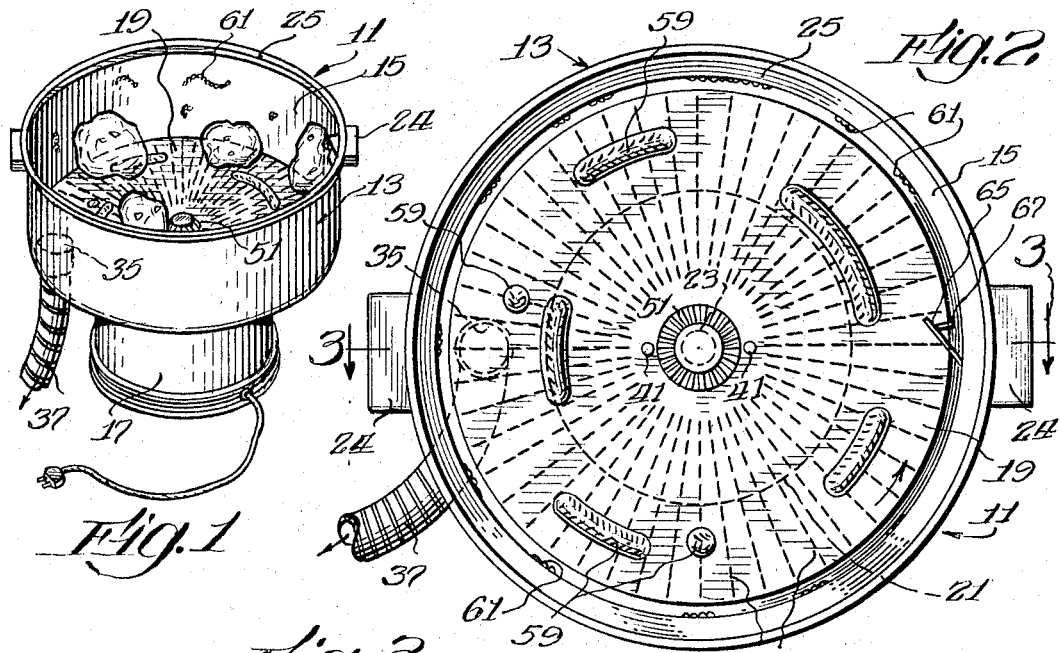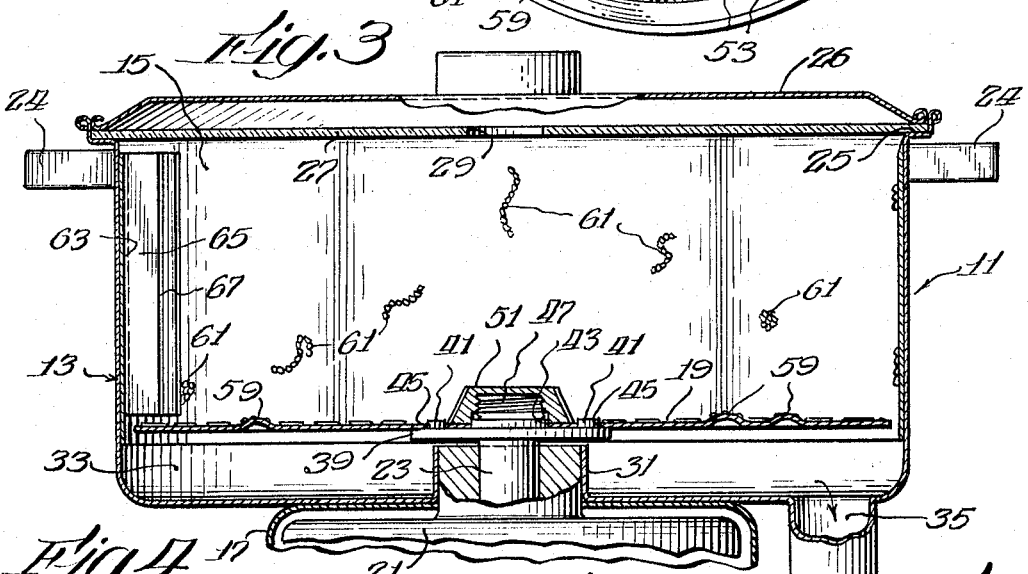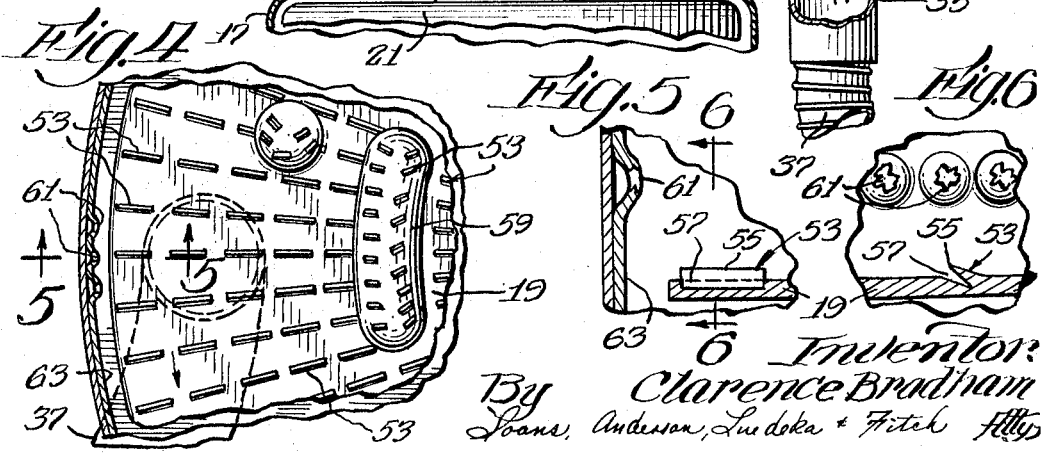

3,266,540
APPARATUS FOR PEELING FRUITS AND VEGETABLES
Clarence Bradham, Quincy, Ill., assignor of one-half to Francis E. Step, Quincy, Ill.
Filed Jan. 21, 1965, Ser. No. 426,805
7 Claims. (Cl. 146—49)

This is a continuation-in-part of application Serial No. 224,598, filed September 14, 1962, now abandoned.

This invention relates generally to a device for removing surface layers from certain fruits and vegetables and, more particularly, it relates to a device for removing skins from potatoes.

The need for a machine which would remove the skins from certain fruits and vegetables has long been recognized by those concerned with the culinary arts. The difficulty in the removal of these skins, especially the skins of potatoes, has resulted in avoidance of the use of these fruits or vegetables.

Many attempts have been made to produce automatic peeling machines which would alleviate these difficulties. Some attempts have resulted in complicated mechanical machines which have been primarily suitable for large scale production lines. Other machines, while being less complicated in mechanical apparatus, have achieved their simplicity only by allowing a significant percentage of the fruit or vegetable to be removed along with the skins. Such machines have proved unsatisfactory because of the waste involved.

Accordingly, the principal object of this invention is to provide an improved device which will remove surface layers from certain fruits and vegetables. Another object of the invention is to provide such a device which will remove a minimum amount of the fruit or vegetable along with the skin. A further object of the invention is to provide a device which can be used on a small scale peeling operation and which is especially suitable for use in homes. A still further object of the invention is to provide an improved device for removing the skins and eyes from a plurality of potatoes without excess removal of the potato beneath the skin.

These and other objects of the invention are accomplished in accordance with the following detailed description and the accompanying drawings wherein:

FIGURE 1 is a perspective view of a device embodying various of the features of the invention with potatoes shown in the device;

FIGURE 2 is a plan view of the device shown in FIGURE 1 with the potatoes removed;

FIGURE 3 is a sectional view, with the cover and lid shown in place, taken along line 3—3 of FIGURE 2;

FIGURE 4 is a fragmentary plan view of the device shown in FIGURE 2, particularly illustrating the plate and adjacent side wall;

FIGURE 5 is a fragmentary view taken along the line 5—5 of FIGURE 4; and

FIGURE 6 is a fragmentary view taken along the line 6—6 of FIGURE 5.

The device illustrated in the drawing will generally be described with respect to its use with potatoes. Although, its principal use appears to lie in the peeling of potatoes, the device is suitable for the removal of skins of other fruits and vegetables.

The machine 11 illustrated in FIGURE 1 is a preferred embodiment including various of the features of the invention. Generally, the machine 11 comprises a container 13 forming a chamber 15 and a base 17, both of which are generally cylindrical in shape. In the chamber 15, the skin is removed from the potatoes. The container 13 has a horizontal plate 19 rotatably mounted therein which is disposed generally near the bottom of the container 13. The base 17 serves as a supporting stand for the container 13 and houses an electric motor 21 which is utilized to rotate the plate 19. A drive shaft 23 connects the motor 21 to the plate 19.

The upper end of the container 13 is open and provides access to the chamber 15. A pair of handles 24 are provided on the container 13 to facilitate moving the machine 11 from place to place. The upper periphery of the container 13 is flanged outwardly in order to provide a seat 25 for a lid 26 for the container 13. Preferably, a transparent cover 27, having a finger hole 29 therein to facilitate its insertion, may be provided. The cover 27 is located below the lid 26 on the container 13, as shown in FIGURE 3. The cover 27 permits the operation of the machine 11 to be observed without any scattering of skin. The central portion of the bottom surface of the container 13 is flanged inwardly and upwardly, as best seen in FIGURE 3, so as to provide a generally circular neck 31 through which the electric motor 21 housing and shaft 23 extends. This neck 31 creates an annular well 33 into which removed skin can fall and accumulate without interfering with the operation of the machine. Near the outer edge of the well 33 is provided a downwardly extending outlet 35 to which a suitable draining hose 37 is attached, the function of which will be hereinafter described.

To provide connection for the plate 19 to the motor 21, the shaft 23 of the motor has an adapter 39 fixedly attached thereto at a position slightly above the upper edge of the neck 31. The adapter 39 has a generally flat upper surface from which upstanding pins 41 project. The plate 19 has an enlarged central hole 43 proportioned to snugly fit around the shaft 23 and a pair of adjacent small holes 45 positioned to receive the pins 41. Thus, the plate 19 seats flush against the adapter 39 and is positively rotated by the pair of pins 41.

The upper end portion of the motor shaft 23 is provided with threads 47 that serve to hold a screw type cap 51 which is adapted to fit over the end of the shaft 23. The cap 51 screws downwardly against the plate 19 and thus holds the plate firmly against the adapter 39. The threads of the cap 51 and of the shaft 23 are right or left hand, depending on the direction of rotation of the motor, so that the cap 51 will remain firmly upon the shaft 23.

The rotating plate 19 provides skin removal. To accomplish this, a plurality of serrations 53 are provided in the upper surface of the plate 19. These serrations 53 are spaced uniformly along the radii of the plate 19 and are distributed over substantially the entire surface thereof. The serrations 53 can be created in any suitable manner, as by being struck from the surface of the plate by angularly hitting a chisel point against the plate surface.

As best seen in FIGURE 6, these serrations 53 comprise a scraping edge 55 which is pointed in the direction in which the plate 19 will rotate. Below each of the scraping edges 55 a recess 57 is disposed, which is created when the edge 55 is struck from the plate surface. These recesses 57 do not extend through the plate 19, but terminate therein. Accordingly, as the plate 19 rotates, the scraping edges 55 come in contact with the outer surface of the potatoes in the chamber 15, and a portion of the skin of the potatoes is scraped therefrom. Inasmuch as potatoes and the like have irregular surfaces with depressions, further means are provided to assure cleaning and scraping the skin from these irregular surfaces.

A number of raised sections or bumps 59 are provided on the surface of the plate 19 so as to effectively remove the skin and eyes from the potatoes. As can be seen in FIGURE 2, these bumps are of various lengths, widths and heights. The bumps 59 can be provided in any suitable manner, as by denting or otherwise striking the bottom surface of the plate 19. Forming the bumps in such a manner is preferable so the transition surfaces from plate to bumps are curved rather than sharp-edged joints wherein skin might collect. Thus, the bumps 59 extend upwardly from the generally flat surface of the plate 19 so as to some in contact with the depressions in the potatoes. Moreover, the bumps 59 are preferably smooth, except for the serrations 53 which they carry. The bumps 59 are spaced irregularly about the surface of the plate 19 so that they will most likely come in contact with different portions of the potatoes as the potatoes are tumbled about in the chamber 15. The heights of the bumps are about ¼ inch whereas their lengths vary from about ½ inch to about 3 inches.

If the only mechanism that was provided was a serrated plate rotating within a smooth-walled chamber, the objects placed therein would be generally carried along by the plate, sliding against the smooth-walled sides of the container 13. Although some peeling would take place, truly effective peeling action would not occur in such a device.

One way in which the potatoes are prevented from merely being carried along with the rotating plate 19 is by providing a plurailty of irregularly shaped abrasions 61 in the inner wall of the container 13. These abrasions 61 may be formed in any suitable manner. Preferably, an insert 63 in which the abrasions 61 have been punched is placed within the container 13 adjacent the inner wall thereof. As can be seen in FIGURES 1 and 3, the abrasions 61 are irregularly spaced in groups across the cylindrical surface and throughout the height of the cylindrical walls, so they will contact potatoes being carried anywhere along the outside of the plate 19.

The generally circular configuration of each of the abrasions 61 is particularly designed to remove the eyes from potatoes being peeled. Because the eyes are set slightly below the adjacent surface of the potato, they are usually difficult to remove without also removing a sizable portion of the edible part of the potato. However, once the surrounding peeling has been removed from the areas in which eyes are situated, the eyes are readily removed by the abrasions 61. The rather jagged generally circular aperture of each of the abrasions 61 is especially suited for plucking out the eyes of a nearly peeled potato with which it comes in contact. The abrasion 61 accomplishes this task without excessive removal of potato.

It is also clear, from an understanding of centrifugal force, that objects placed upon a rotating plate move to its outward perimeter as the plate rotates. In this respect, the heavier or larger potatoes would tend to position themselves against the inner walls of the container 13 because of their greater weight. The smaller potatoes would accordingly be left near the center of the plate where effective scraping action might not occur because the potatoes would generally ride along with the plate in this area.

To prevent the potatoes from riding along with the plate and provide for more efficient tumbling action of all the potatoes, an elongated deflector or bumper 65 is preferably provided. Although some peeling would be accomplished without the deflector 65, peeling is far more efficient when one is provided. The deflector 65 is vertically disposed at a point within the chamber and extends substantially from the surface of the plate 19 to the cover 27. If desired, more than one deflector 65 may be employed, at spaced-apart points.

As best seen in FIGURE 2, the deflector 65 comprises a resilient plate, which is attached at its one edge to the circular insert 63. A resilient bumper is preferred although rigid bumpers may also be used. The deflector 65 extends angularly inward into the chamber 15 and its inner edge points generally in the direction of rotation of the plate 19, thereby presenting an oblique surface to the on-coming potatoes. The deflector 65 has some spring and gives slightly when hit by each potato. A rear lug 67 is provided on the deflector 65 adjacent its inner edge and this lug 67 contacts the cylindrical wall to limit deflection of the deflector 65. Thus, as each of the outermost potatoes hits the deflector 65, it is projected or flipped inwardly therefrom. The spring-like action of the deflector 65 thus provides for very effective tumbling action that continues within the peeling chamber as long as the machine is operated.

If desired, the abrasions 61, instead of being provided along the entire inner cylindrical wall, may be formed in the vertical surface of the deflector 65 against which the potatoes strike. Although such an arrangement is not as effective in removing the potato eyes as is provision along the entire inner cylindrical wall, it is considered to perform satisfactorily, especially when more than one deflector 65 is employed.

It has also been found that the speed of rotation of the plate 19 is important to limit the removal which is accomplished to the skin of the potato. Operation of the machine at too high a speed produces wasteful removal of the potato. Operation at too low a speed produces incomplete peeling of the potatoes. For a scraping plate with about a 10 inch diameter, rotation of the plate at between about 900 r.p.m. and about 1100 r.p.m. has proved satisfactory.

In operation, the machine 11 is filled with a plurality of potatoes to be peeled, and the transparent cover 29 placed on the container 13. As soon as the motor 21 is started, the plate 19 rotates and removal of skin begins. As the potatoes tumble about in the peeling chamber 15, the scraping edges 55 of the serrations 53 on the plate 19 scrape portions of the skin therefrom. As each of the serrations 53 scrapes under the potatoes and removes portions of the skin, some of the removed skin is deposited in the recesses 57 beneath the scraping edges 55. Other particles of the scraped skin fall freely upon the plate 19 and, by centrifugal action, are thrown toward the outer edge thereof. As can best be seen in FIGURES 2 and 3, the rotating plate 19 has a diameter slightly less than that of the chamber 15. The scraped off skin falls between the plate 19, and the container wall into the annular well 33 provided below the plate 19. At the end of the operation, water is used to wash the peel particles out of the well 33 through the draining hose 37.

As the skin builds up in the recesses 57 of the serrations 53, the scraping edges 55 subsequently cut less and less deeply into the outer surface of the potatoes. Therefore, less and less scraping takes place as the peeled area of the potatoes increases. Because the serrations 53 do not cut deeply into the soft, peeled surfaces of the potatoes, they thus do not carry away any substantial amount of the edible potato. In this respect, the total volume of the recesses 57 in the plate 19 is preferably proportioned with respect to the amount of skin that will be peeled from the approximate number of potatoes that can be placed conveniently in the peeling chamber. By such proportioning, it is assured that the recesses are not filled up prematurely.

To clean the skin from the recesses, it is only necessary to pour a large glass of water on the rotating plate. Moreover, if the machine 11 is used with other fruits or vegetables from which a greater thickness of skin will be removed, the recesses 57 of the serrations can be easily cleared by pouring or spraying water into the peeling chamber after the machine has been run for two or three minutes. Water provided in this manner removes significant amounts of the material filling the recesses 57 and thus provides renewed scraping action. Even when the machine 11 is used to peel potatoes, by stopping it just before removing the potatoes, pouring water onto the potatoes and restarting the machine for a few seconds, a more thorough cleaning of the potatoes is provided by washing the loose particles from the peeled surfaces.

Thus, there has been provided a novel machine which can be simply constructed at minimal cost. The machine achieves quick, efficient peeling of potatoes with little waste and is especially suitable for household use.

Although the invention has been described with reference to one particular embodiment of apparatus, it should be clearly understood that the scope of the invention is not so limited but encompasses modifications and adaptations which are obvious to a person skilled in the art. For example, it would not be necessary to provide the apparatus with a self-contained motor, but it might well be adapted for simple connection with an appliance already available in most kitchens, such as an electric mixer. The scope of the invention is limited only by the appended claims.

Various of the features of the invention are set forth in the following claims.

What is claimed is:

1. Apparatus for simultaneously removing surface layers from fruits and vegetables which apparatus comprises means defining a generally cylindrical chamber for receiving the fruits and vegetables, a serrated member at the bottom of said chamber, means for effecting rotary movement between said serrated member and said chamber, abrasive means disposed along the inner cylindrical wall of said chamber, and resilient bumper means mounted within said chamber for deflecting the fruits and vegetables from their otherwise normal paths during rotary movement between said serrated member and said chamber so as to effectively tumble the fruits and vegetables and permit surface layer removal, said resilient bumper means including an elongated resilient plate disposed generally parallel to the axis of said cylindrical chamber and means mounting said plate along one longitudinal edge thereof to the inner wall of said chamber so that it extends obliquely into said chamber and so that the other longitudinal edge thereof is free to move when contacted by the fruits or vegetables being treated.

2. Apparatus for simultaneously peeling a plurality of potatoes, which apparatus comprises means defining a generally cylindrical chamber for receiving the potatoes, a serrated member rotatably mounted within said chamber so as to provide a bottom therefor, drive means connected to said member for rotating said serrated member at a controlled speed, a plurality of abrasions disposed along the inner cylindrical wall of said chamber, said abrasions being generally hemispherical protrusions which extend into said chamber and which contain generally circular, jagged apertures proportioned to the approximate size of an eye of a normal potato, and bumper means mounted within said chamber for deflecting the potatoes from their otherwise normal paths, whereby during operation of said drive means said serrated member scrapes the skin from the potatoes and said abrasions remove the eyes of the potatoes.

3. Apparatus for simultaneously removing skins from fruits or vegetables, which apparatus comprises means defining a generally cylindrical chamber for receiving fruits or vegetables, a serrated plate rotatably mounted within said chamber so as to provide a bottom therefor, said serrated plate including a plurality of radially disposed scraping edges with recesses disposed below each of said edges, said recesses each being closed at the bottom thereof and open at the top so that it fills up with scraped-off skin and causes said associated scraping edge to cut less deeply as skin removal progresses, and bumper means mounted within said chamber for deflecting the fruits and vegetables from their otherwise normal paths during rotation of said serrated plate so as to effectively tumble the fruits and vegetables and insure complete skin removal, said resilient bumper means including an elongated resilient plate disposed generally parallel to the axis of said cylindrical chamber and means mounting said plate along one longitudinal edge thereof to the inner wall of said chamber so that it extends obliquely into said chamber and so that the other longitudinal edge thereof is free to move when contacted by the fruits or vegetables being treated.

4. Apparatus for simultaneously removing skins from fruits or vegetables, which apparatus comprises means defining a generally cylindrical chamber for receiving fruits or vegetables, a serrated plate rotatably mounted within said chamber so as to provide a bottom therefor, said serrated plate including a plurality of radially disposed scraping edges with recesses disposed below each of said edges, each of said recesses being closed at the bottom thereof and at the radially outward side thereof and open at the top so that said recess fills up with scrape-off skin and causes said associated scraping edge to cut less deeply as skin removal progresses, and means mounted within said chamber for preventing the fruits and vegetables from being carried along with the surface of said plate during rotation of said serrated plate.

5. Apparatus for simultaneously removing skins from fruits or vegetables, which apparatus comprises means defining a generally cylindrical chamber for receiving fruits or vegetables, and a serrated plate rotatably mounted within said chamber so as to provide a bottom therefor, said serrated plate including a plurality of elongated radially disposed scraping edges with recesses disposed below each of said edges, each of said recesses being closed at the bottom thereof and at the radially outward side thereof and open at the top so that said recess fills up with scraped-off skin and causes said associated scraping edge to cut less deeply into the fruits or vegetables as skin removal progresses.

6. Apparatus for simultaneously removing skins from potatoes, which apparatus comprises means defining a generally cylindrical chamber for receiving potatoes, a serrated member rotatably mounted within said chamber so as to provide a bottom therefor, said serrated member being generally in the form of a plate including a plurality of serrated bumps formed thereupon and adapted to engage the surfaces of any depression in the potatoes, the serrations of said bumps each including a scraping edge with a recess disposed below said edge, said recesses each being closed at the bottom thereof and open at the top so that the recess fills up with scraped-off skin and causes said associated scraping edge to cut less deeply as skin removal progresses, bumper means mounted within said chamber for deflecting the potatoes from their otherwise normal paths during rotary movement of said serrated member so as to effectively tumble the potatoes and insure complete skin removal, and abrasions on said bumper means in a location to contact the potatoes being deflected, said abrasions being generally hemispherical protrusions which contain jagged apertures proportioned to the approximate size of an eye of a normal potato.

7. Apparatus for simultaneously removing skins from fruits or vegetables which apparatus comprises means defining a generally cylindrical chamber for receiving fruits or vegetables, and a serrated plate mounted for rotation about an axis within said chamber so as to provide a bottom therefor, said serrated plate having a plurality of bumps formed thereupon and adapted to engage the surfaces of any depression in the fruits or vegetables, said bumps being provided with serrations including a scraping edge and a recess disposed below said edge, said recesses each being closed at the bottom thereof and at the outward side thereof from said axis of rotation and open at the top so that the recess fills up with scraped-off skin and causes said associated scraping edge to cut less deeply as skin removal progresses.

References Cited by the Examiner

UNITED STATES PATENTS

| | | | |
|---|---|---|---|
| 1,695,420 | 12/1928 | Eckert | 146—50 |
| 1,945,978 | 2/1934 | Palombo et al. | 146—49 |
| 2,009,627 | 7/1935 | Laib | 146—49 |
| 2,831,517 | 4/1958 | Pouzoulet | 146—49 |

FOREIGN PATENTS

| | | |
|---|---|---|
| 610,408 | 10/1948 | Great Britain. |
| 722,680 | 1/1955 | Great Britain. |

ROBERT C. RIORDON, *Primary Examiner.*

WILLIE G. ABERCROMBIE, *Examiner.*